No. 772,144. PATENTED OCT. 11, 1904.
A. HAYES.
NUT LOCK.
APPLICATION FILED JULY 20, 1904.
NO MODEL.
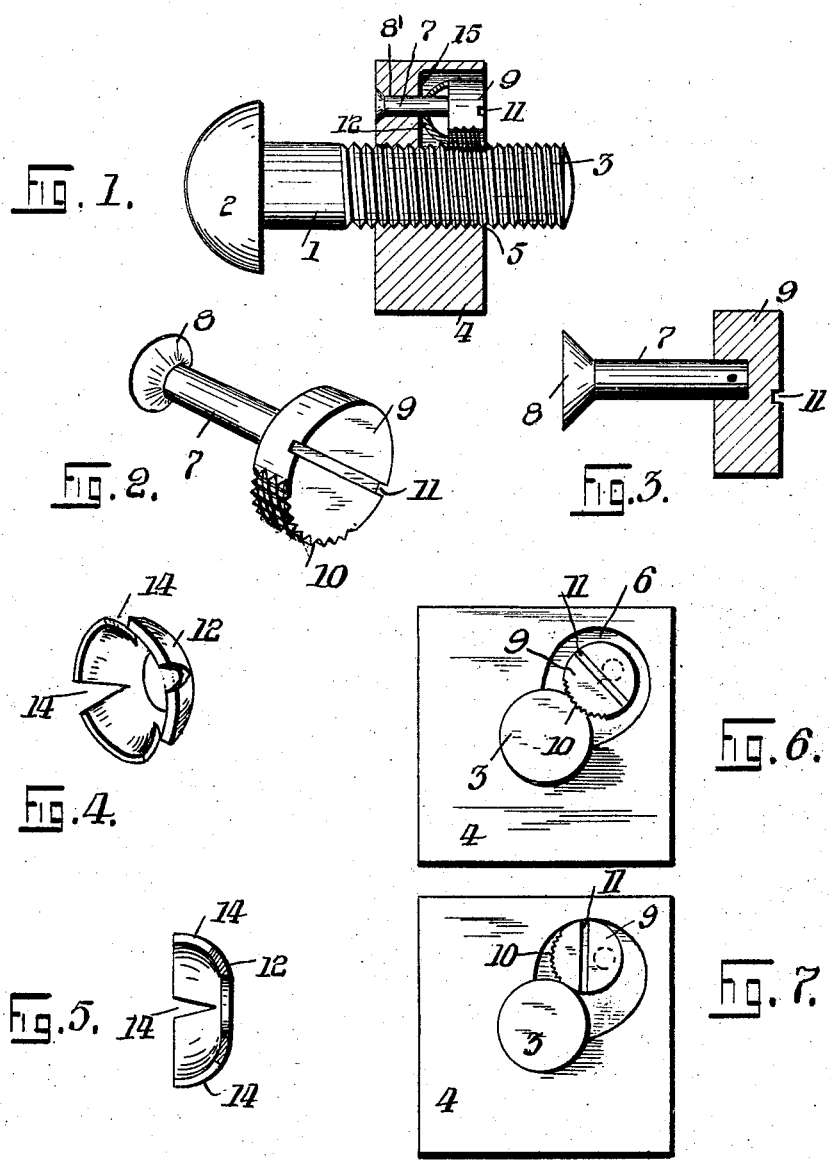
Witnesses:
C. Klostermann
H. H. Butler
Inventor.
Oliver Hayes
by H. C. Evert & Co.
Attorneys.

No. 772,144.

Patented October 11, 1904.

UNITED STATES PATENT OFFICE.

ALEXANDER HAYES, OF EMPIRE, OHIO.

NUT-LOCK.

SPECIFICATION forming part of Letters Patent No. 772,144, dated October 11, 1904.

Application filed July 20, 1904. Serial No. 217,392. (No model.)

*To all whom it may concern:*

Be it known that I, ALEXANDER HAYES, a citizen of the United States of America, residing at Empire, in the county of Jefferson and State of Ohio, have invented certain new and useful Improvements in Nut-Locks, of which the following is a specification, reference being had therein to the accompanying drawings.

This invention has relation to nut-locks, and has for its object to provide novel means whereby when the nut has been once placed upon the bolt it will be impossible for the same to become disengaged therefrom.

Another object of my invention is to provide a nut-lock which will be extremely simple in construction, strong and durable, and highly efficient when used, and in constructing my improved nut-lock I mount the locking means within the nut, whereby it will not be necessary to use a specially-constructed bolt or employ other means than the nut to form the lock.

Briefly described, my invention consists in employing a nut having the ordinary screw-threaded aperture therein, and in the one side of said nut and adjacent to this aperture I form a recess in which is eccentrically mounted a toothed wheel that is adapted when in one position to engage the threads of a bolt and lock the nut thereon. In connection with the wheel I employ means for holding the wheel in this locked position and means whereby the same may be released when it is desired.

The details of the above construction will be hereinafter more fully described, and referring to the drawings accompanying this application like numerals of reference indicate like parts throughout the several views, in which—

Figure 1 is a vertical sectional view of my improved nut-lock, showing the same in position upon a bolt. Fig. 2 is a detail perspective view of the locking-wheel. Fig. 3 is a vertical sectional view of the same. Fig. 4 is a detail perspective view of a spring-washer employed in connection with my improved nut-lock. Fig. 5 is a vertical sectional view of the same. Fig. 6 is a front elevation of my improved nut, showing the same in a locked position upon the end of a bolt; and Fig. 7 is a similar view showing the nut in an unlocked position.

To put my invention into practice, I employ a bolt 1, having a head 2 and a screw-threaded end 3, this bolt being of the ordinary and well-known construction and may be of any size desired.

The reference-numeral 4 indicates a nut which, as illustrated in the accompanying drawings, is rectangular in form, although a hexagon or octagon nut may be readily employed, and this nut is provided with a screw-threaded aperture 5 to receive the screw-threaded end 3 of the bolt. In the one face of the nut adjacent to the screw-threaded aperture 5 I form a recess 6, and in this recess is mounted my improved locking means for securing a nut upon the bolt.

The reference-numeral 7 indicates a bolt having a head 8 formed on its one end, and this bolt is rotatably mounted in an aperture 8', formed in the nut 4, this aperture communicating with the recess 6, whereby a wheel 9 may be secured upon the end of the bolt by any desired means, as illustrated in Fig. 3 of the drawings, this connection being preferably made by shrinking the bolt upon the wheel 9. The wheel is mounted eccentrically upon the bolt, and upon its one side is provided with teeth 10, and in the face of the wheel is provided a slot 11, whereby the blade of a screw-driver or a like instrument may be placed therein to rotate the wheel 9.

The reference-numeral 12 indicates a cup-shaped washer which has its sides split, as indicated at 14, whereby the sides may be expanded by pressure upon the same, and this washer is mounted between the wheel 9 and the rear wall 15 of the recess, and the washer is adapted to normally force the wheel outwardly and when in a locked position facilitate the gripping of the teeth 10 with the threads 3 of the bolt. When it is desired to lock the nut upon the bolt, the nut is rotated until it has reached the position upon the bolt to which it is to be locked, at which time an instrument is inserted in the slot 11 and the wheel rotated until the teeth 10 of said wheel, which are of the same pitch as the threads 3, engage said threads of the bolt, as illustrated in Figs. 1 and 6 of the drawings.

It will be noted that the recess 6 may be formed in any portion of the nut adjacent to the screw-threaded aperture 5, and various other changes may be made in the details of construction without departing from the spirit and scope of the invention. The cup-shaped spring-washer will press against the rear face of the wheel 9 and impinge the threads 10 of the said wheel in the threads 3 of the bolt. To release the nut and rotate the wheel 9, said wheel is pressed inwardly to compress the washer, at which time it may be rotated to disengage the threads 10 from the threads 3 of the bolt.

What I claim is—

The combination with a bolt, of a nut having a screw-threaded aperture formed therein, said nut having a recess formed therein, adjacent to said aperture, a toothed wheel eccentrically mounted within said recess, a cup-shaped washer interposed between said wheel and said recess, said wheel having a slot formed therein, substantially as described and for the purpose set forth.

In testimony whereof I affix my signature in the presence of two witnesses.

ALEXANDER HAYES.

Witnesses:
MARY E. MINOR,
E. S. MINOR.